(12) United States Patent
Nelken et al.

(10) Patent No.: US 9,699,129 B1
(45) Date of Patent: Jul. 4, 2017

(54) SYSTEM AND METHOD FOR INCREASING EMAIL PRODUCTIVITY

(75) Inventors: Yoram Nelken, San Francisco, CA (US); Stewart Elliot, Oakland, CA (US); Brian Swanson, Petaluma, CA (US); Nissan Hajaj, Foster City, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2132 days.

(21) Appl. No.: 10/610,964

(22) Filed: Jun. 30, 2003

Related U.S. Application Data

(63) Continuation-in-part of application No. 10/112,230, filed on Mar. 27, 2002, now Pat. No. 8,290,768, which is a continuation of application No. 09/602,588, filed on Jun. 21, 2000, now Pat. No. 6,408,277.

(51) Int. Cl.
*G06F 15/16* (2006.01)
*H04L 12/58* (2006.01)

(52) U.S. Cl.
CPC .............. *H04L 51/22* (2013.01); *H04L 51/26* (2013.01)

(58) Field of Classification Search
USPC ........................................................ 709/206
See application file for complete search history.

(56) References Cited

U.S. PATENT DOCUMENTS

| 3,648,253 A | 3/1972 | Mullery et al. |
| 4,110,823 A | 8/1978 | Cronshaw et al. |
| 4,286,322 A | 8/1981 | Hoffman et al. |

(Continued)

FOREIGN PATENT DOCUMENTS

| CA | 2180392 | 2/2001 |
| EP | 0 597 630 | 5/1994 |

(Continued)

OTHER PUBLICATIONS

Androutsopoulos, Ion et al. "An Experimental Comparison of Naïve Bayesian and Keyword-Based Anti-Spam Filtering with Personal E-mail Messages." Proceedings of the 23rd annual international ACM SIGIR conference on Research and development in information retrieval. ACM Press. Jul. 2000. 160-167.*

(Continued)

*Primary Examiner* — Jeffrey R Swearingen
(74) *Attorney, Agent, or Firm* — Gates & Cooper LLP

(57) ABSTRACT

A system and method for increasing email productivity based on an analysis of the content of received email messages. The system includes a content analysis engine that analyzes the content of a received email message using natural language processing techniques. A prioritization module produces a priority score and a priority level for the message using a prioritization knowledge base. A message sorting module produces a set of suggested folders for the message using a sorting knowledge base. A junkmail module produces a junkman score for the message using a junkmail knowledge base. The prioritization knowledge base, the sorting knowledge base, and the junkmail knowledge base are updated with feedback from the user for each received email message, which allows the system to learn in real-time the user's preferences.

32 Claims, 6 Drawing Sheets

| Junkmail | Score | Priority | From | Subject | Received | |
|---|---|---|---|---|---|---|
| 3 | 55 | Med | John Doe | Customer X | 2/5/2003 | ← 532 |
| 85 | 15 | Low | Marketing Co. | Lose Weight Now! Only $29.95/mo. | 2/5/2003 | ← 534 |
| 12 | 72 | High | Jane Smith | Your Order #123 from Vendor A | 2/4/2003 | ← 536 |
| 48 | 31 | Med | Bob Jones | FW: Check this out! | 2/4/2003 | ← 538 |

(56) References Cited

U.S. PATENT DOCUMENTS

| | | |
|---|---|---|
| 4,586,160 A | 4/1986 | Amano et al. |
| 4,642,756 A | 2/1987 | Sherrod |
| 4,658,370 A | 4/1987 | Erman et al. |
| 4,724,523 A | 2/1988 | Kucera |
| 4,805,107 A | 2/1989 | Kieckhafer et al. |
| 4,814,974 A | 3/1989 | Narayanan et al. |
| 4,908,865 A | 3/1990 | Doddington et al. |
| 4,918,735 A | 4/1990 | Morito et al. |
| 4,942,527 A | 7/1990 | Schumacher |
| 4,984,178 A | 1/1991 | Hemphill et al. |
| 5,018,215 A | 5/1991 | Nasr et al. |
| 5,023,832 A | 6/1991 | Fulcher et al. |
| 5,040,141 A | 8/1991 | Yazima et al. |
| 5,051,924 A | 9/1991 | Bergeron et al. |
| 5,060,155 A | 10/1991 | Van Zuijlen |
| 5,067,099 A | 11/1991 | McCown et al. |
| 5,068,789 A | 11/1991 | van Vliembergen |
| 5,099,425 A | 3/1992 | Kanno et al. |
| 5,101,349 A | 3/1992 | Tokuume et al. |
| 5,111,398 A | 5/1992 | Nunberg et al. |
| 5,125,024 A | 6/1992 | Gokcen et al. |
| 5,210,872 A | 5/1993 | Ferguson et al. |
| 5,228,116 A | 7/1993 | Harris et al. |
| 5,230,054 A | 7/1993 | Tamura |
| 5,247,677 A | 9/1993 | Welland et al. |
| 5,251,129 A | 10/1993 | Jacobs |
| 5,251,131 A | 10/1993 | Masand et al. |
| 5,265,033 A | 11/1993 | Vajk et al. |
| 5,278,942 A | 1/1994 | Bahl et al. |
| 5,287,430 A | 2/1994 | Iwamoto |
| 5,321,608 A | 6/1994 | Namba et al. |
| 5,325,298 A | 6/1994 | Gallant |
| 5,325,526 A | 6/1994 | Cameron et al. |
| 5,345,501 A | 9/1994 | Shelton |
| 5,349,526 A | 9/1994 | Potts et al. |
| 5,365,430 A | 11/1994 | Jagadish |
| 5,369,570 A | 11/1994 | Parad |
| 5,369,577 A | 11/1994 | Kadashevich et al. |
| 5,371,807 A | 12/1994 | Register et al. |
| 5,377,354 A | 12/1994 | Scannell et al. |
| 5,418,717 A | 5/1995 | Su et al. |
| 5,418,948 A | 5/1995 | Turtle |
| 5,437,032 A | 7/1995 | Wolf et al. |
| 5,444,820 A | 8/1995 | Tzes et al. |
| 5,475,588 A | 12/1995 | Schabes et al. |
| 5,483,466 A | 1/1996 | Kawahara et al. |
| 5,487,100 A | 1/1996 | Kane |
| 5,493,677 A | 2/1996 | Balogh et al. |
| 5,493,692 A | 2/1996 | Theimer et al. |
| 5,506,787 A | 4/1996 | Muhlfeld et al. |
| 5,526,521 A | 6/1996 | Fitch et al. |
| 5,528,701 A | 6/1996 | Aref |
| 5,542,088 A | 7/1996 | Jennings, Jr. et al. |
| 5,555,344 A | 9/1996 | Zunkler |
| 5,559,710 A | 9/1996 | Shahraray et al. |
| 5,577,241 A | 11/1996 | Spencer |
| 5,590,055 A | 12/1996 | Chapman et al. |
| 5,594,641 A | 1/1997 | Kaplan et al. |
| 5,596,502 A | 1/1997 | Koski et al. |
| 5,610,812 A | 3/1997 | Scabes et al. |
| 5,615,360 A | 3/1997 | Bezek et al. |
| 5,627,914 A | 5/1997 | Pagallo |
| 5,630,128 A | 5/1997 | Farrell et al. |
| 5,634,053 A | 5/1997 | Noble et al. |
| 5,634,121 A | 5/1997 | Tracz et al. |
| 5,636,124 A | 6/1997 | Rischar et al. |
| 5,649,215 A | 7/1997 | Itoh |
| 5,664,061 A | 9/1997 | Andreshak et al. |
| 5,680,628 A | 10/1997 | Carus |
| 5,687,384 A | 11/1997 | Nagase |
| 5,694,616 A | 12/1997 | Johnson et al. |
| 5,701,400 A | 12/1997 | Amado |
| 5,708,829 A | 1/1998 | Kadashevich |
| 5,715,371 A | 2/1998 | Ahamed et al. |
| 5,721,770 A | 2/1998 | Kohler |
| 5,721,897 A | 2/1998 | Rubinstein |
| 5,724,481 A | 3/1998 | Garberg et al. |
| 5,737,621 A | 4/1998 | Kaplan et al. |
| 5,737,734 A | 4/1998 | Schultz |
| 5,745,652 A | 4/1998 | Bigus |
| 5,745,736 A | 4/1998 | Picart |
| 5,748,973 A | 5/1998 | Palmer et al. |
| 5,754,671 A | 5/1998 | Higgins et al. |
| 5,761,631 A | 6/1998 | Nasukawa |
| 5,765,033 A | 6/1998 | Miloslavsky |
| 5,768,578 A | 6/1998 | Kirk et al. |
| 5,794,194 A | 8/1998 | Takebayashi et al. |
| 5,799,268 A | 8/1998 | Boguraev |
| 5,802,253 A | 9/1998 | Gross et al. |
| 5,806,040 A | 9/1998 | Vensko |
| 5,809,462 A | 9/1998 | Nussbaum |
| 5,809,464 A | 9/1998 | Kopp et al. |
| 5,822,731 A | 10/1998 | Schultz |
| 5,822,745 A | 10/1998 | Hekmatpour |
| 5,826,076 A | 10/1998 | Bradley et al. |
| 5,832,220 A | 11/1998 | Johnson et al. |
| 5,832,470 A | 11/1998 | Morita et al. |
| 5,835,682 A | 11/1998 | Broomhead et al. |
| 5,845,246 A | 12/1998 | Schalk |
| 5,850,219 A | 12/1998 | Kumomura |
| 5,860,059 A | 1/1999 | Aust et al. |
| 5,864,848 A | 1/1999 | Horvitz et al. |
| 5,864,863 A | 1/1999 | Burrows |
| 5,867,495 A | 2/1999 | Elliott et al. |
| 5,878,385 A | 3/1999 | Bralich et al. |
| 5,878,386 A | 3/1999 | Coughlin |
| 5,884,032 A | 3/1999 | Bateman et al. |
| 5,884,302 A | 3/1999 | Ho |
| 5,890,142 A | 3/1999 | Tanimura et al. |
| 5,890,147 A | 3/1999 | Peltonen et al. |
| 5,895,447 A | 4/1999 | Ittycheriah et al. |
| 5,899,971 A | 5/1999 | De Vos |
| 5,913,215 A | 6/1999 | Rubinstein et al. |
| 5,920,835 A | 7/1999 | Huzenlaub et al. |
| 5,933,822 A | 8/1999 | Braden-Harder et al. |
| 5,937,400 A | 8/1999 | Au |
| 5,940,612 A | 8/1999 | Brady et al. |
| 5,940,821 A | 8/1999 | Wical |
| 5,944,778 A | 8/1999 | Takeuchi et al. |
| 5,946,388 A | 8/1999 | Walker et al. |
| 5,948,058 A * | 9/1999 | Kudoh et al. ................. 709/206 |
| 5,950,184 A | 9/1999 | Kartutunen |
| 5,950,192 A | 9/1999 | Moore et al. |
| 5,956,711 A | 9/1999 | Sullivan et al. |
| 5,960,393 A | 9/1999 | Cohrs et al. |
| 5,963,447 A | 10/1999 | Kohn et al. |
| 5,963,894 A | 10/1999 | Riachardson et al. |
| 5,970,449 A | 10/1999 | Alleva et al. |
| 5,974,385 A | 10/1999 | Ponting et al. |
| 5,974,465 A | 10/1999 | Wong |
| 5,983,216 A | 11/1999 | Kirach |
| 5,991,713 A | 11/1999 | Unger et al. |
| 5,991,751 A | 11/1999 | Rivette et al. |
| 5,991,756 A | 11/1999 | Wu |
| 5,995,513 A | 11/1999 | Harrand et al. |
| 5,999,932 A | 12/1999 | Paul |
| 5,999,990 A | 12/1999 | Sharrit et al. |
| 6,006,221 A | 12/1999 | Liddy et al. |
| 6,009,422 A | 12/1999 | Ciccarelli |
| 6,012,053 A | 1/2000 | Pant et al. |
| 6,018,735 A | 1/2000 | Hunter |
| 6,021,403 A | 2/2000 | Horvitz et al. |
| 6,025,843 A | 2/2000 | Sklar |
| 6,026,388 A | 2/2000 | Liddy et al. |
| 6,032,111 A | 2/2000 | Mohri et al. |
| 6,035,104 A | 3/2000 | Zahariev |
| 6,038,535 A | 3/2000 | Campbell |
| 6,038,560 A | 3/2000 | Wical |
| 6,055,528 A | 4/2000 | Evans |
| 6,058,365 A | 5/2000 | Nagal et al. |
| 6,058,389 A | 5/2000 | Chandra et al. |
| 6,061,709 A | 5/2000 | Bronte |
| 6,064,953 A | 5/2000 | Maxwell, III et al. |
| 6,064,971 A | 5/2000 | Hartnett |

(56) References Cited

U.S. PATENT DOCUMENTS

| | | | |
|---|---|---|---|
| 6,064,977 A | 5/2000 | Haverstock et al. | |
| 6,067,565 A | 5/2000 | Horvitz | |
| 6,070,149 A | 5/2000 | Tavor et al. | |
| 6,070,158 A | 5/2000 | Kirsch et al. | |
| 6,073,098 A | 6/2000 | Buchsbaum et al. | |
| 6,073,101 A | 6/2000 | Maes | |
| 6,073,142 A | 6/2000 | Geiger et al. | |
| 6,076,088 A | 6/2000 | Paik et al. | |
| 6,081,774 A | 6/2000 | de Hita et al. | |
| 6,085,159 A | 7/2000 | Ortega et al. | |
| 6,092,042 A | 7/2000 | Iso | |
| 6,092,095 A | 7/2000 | Maytal | |
| 6,092,103 A * | 7/2000 | Pritsch | 709/206 |
| 6,094,652 A | 7/2000 | Faisal | |
| 6,098,047 A | 8/2000 | Oku et al. | |
| 6,101,537 A | 8/2000 | Edelstein et al. | |
| 6,112,126 A | 8/2000 | Hales et al. | |
| 6,115,734 A | 9/2000 | Mansion | |
| 6,138,128 A | 10/2000 | Perkowitz et al. | |
| 6,138,139 A | 10/2000 | Beck et al. | |
| 6,144,940 A | 11/2000 | Nishi et al. | |
| 6,148,322 A | 11/2000 | Sand et al. | |
| 6,151,538 A | 11/2000 | Bate et al. | |
| 6,154,720 A | 11/2000 | Onishi et al. | |
| 6,161,094 A | 12/2000 | Adcock et al. | |
| 6,161,130 A * | 12/2000 | Horvitz et al. | 709/206 |
| 6,167,370 A | 12/2000 | Tsourikov et al. | |
| 6,169,986 B1 | 1/2001 | Bowman et al. | |
| 6,182,029 B1 | 1/2001 | Friedman | |
| 6,182,036 B1 | 1/2001 | Poppert | |
| 6,182,059 B1 | 1/2001 | Angotti et al. | |
| 6,182,063 B1 | 1/2001 | Woods | |
| 6,182,065 B1 | 1/2001 | Yeomans | |
| 6,182,120 B1 | 1/2001 | Beaulieu et al. | |
| 6,185,603 B1 | 2/2001 | Henderson et al. | |
| 6,199,103 B1 * | 3/2001 | Sakaguchi et al. | 709/206 |
| 6,212,544 B1 | 4/2001 | Borkenhagen et al. | |
| 6,223,201 B1 | 4/2001 | Reznak | |
| 6,226,630 B1 * | 5/2001 | Billmers | 707/3 |
| 6,233,575 B1 | 5/2001 | Agrawal et al. | |
| 6,233,578 B1 | 5/2001 | Machihara et al. | |
| 6,236,987 B1 | 5/2001 | Horowitz et al. | |
| 6,243,679 B1 | 6/2001 | Mohri et al. | |
| 6,243,735 B1 | 6/2001 | Imanishi et al. | |
| 6,249,606 B1 | 6/2001 | Kiraly et al. | |
| 6,256,773 B1 | 7/2001 | Bowman-Amuah | |
| 6,260,058 B1 | 7/2001 | Hoenninger et al. | |
| 6,263,335 B1 | 7/2001 | Paik et al. | |
| 6,269,368 B1 | 7/2001 | Diamond | |
| 6,271,840 B1 | 8/2001 | Finseth et al. | |
| 6,275,819 B1 | 8/2001 | Carter | |
| 6,278,973 B1 | 8/2001 | Chung et al. | |
| 6,282,565 B1 | 8/2001 | Shaw et al. | |
| 6,292,794 B1 | 9/2001 | Cecchini et al. | |
| 6,292,938 B1 | 9/2001 | Sarkar et al. | |
| 6,298,324 B1 | 10/2001 | Zuberec et al. | |
| 6,301,602 B1 | 10/2001 | Ueki | |
| 6,304,864 B1 | 10/2001 | Liddy et al. | |
| 6,304,872 B1 | 10/2001 | Chao | |
| 6,308,197 B1 | 10/2001 | Mason et al. | |
| 6,311,194 B1 | 10/2001 | Sheth et al. | |
| 6,314,439 B1 | 11/2001 | Bates et al. | |
| 6,314,446 B1 | 11/2001 | Stiles | |
| 6,324,534 B1 | 11/2001 | Neal et al. | |
| 6,327,581 B1 | 12/2001 | Platt | |
| 6,349,295 B1 | 2/2002 | Tedesco et al. | |
| 6,353,667 B1 | 3/2002 | Foster et al. | |
| 6,353,827 B1 | 3/2002 | Davies et al. | |
| 6,360,243 B1 | 3/2002 | Lindsley et al. | |
| 6,363,373 B1 | 3/2002 | Steinkraus | |
| 6,363,377 B1 | 3/2002 | Kravets et al. | |
| 6,366,910 B1 | 4/2002 | Rajaraman et al. | |
| 6,370,526 B1 | 4/2002 | Agrawal et al. | |
| 6,374,221 B1 | 4/2002 | Haimi-Cohen | |
| 6,377,945 B1 | 4/2002 | Risvik | |
| 6,377,949 B1 | 4/2002 | Gilmour | |
| 6,389,405 B1 | 5/2002 | Oatman et al. | |
| 6,393,415 B1 | 5/2002 | Getchius et al. | |
| 6,393,465 B2 * | 5/2002 | Leeds | 709/206 |
| 6,397,209 B1 | 5/2002 | Reed et al. | |
| 6,397,212 B1 | 5/2002 | Biffar | |
| 6,401,084 B1 | 6/2002 | Ortega et al. | |
| 6,408,277 B1 | 6/2002 | Nelken | |
| 6,411,947 B1 | 6/2002 | Rice et al. | |
| 6,411,982 B2 | 6/2002 | Williams | |
| 6,415,250 B1 | 7/2002 | van den Akker | |
| 6,418,458 B1 | 7/2002 | Maresco | |
| 6,421,066 B1 | 7/2002 | Sivan | |
| 6,421,675 B1 | 7/2002 | Ryan et al. | |
| 6,424,995 B1 | 7/2002 | Shuman | |
| 6,424,997 B1 | 7/2002 | Buskirk et al. | |
| 6,430,615 B1 | 8/2002 | Hellerstein et al. | |
| 6,434,435 B1 | 8/2002 | Tubel et al. | |
| 6,434,554 B1 | 8/2002 | Asami et al. | |
| 6,434,556 B1 | 8/2002 | Levin et al. | |
| 6,438,540 B2 | 8/2002 | Nasr et al. | |
| 6,438,575 B1 | 8/2002 | Khan et al. | |
| 6,442,542 B1 | 8/2002 | Ramani et al. | |
| 6,442,589 B1 | 8/2002 | Takahashi et al. | |
| 6,446,061 B1 | 9/2002 | Doerre et al. | |
| 6,446,081 B1 | 9/2002 | Preston | |
| 6,446,256 B1 | 9/2002 | Hyman et al. | |
| 6,449,589 B1 | 9/2002 | Moore | |
| 6,449,646 B1 | 9/2002 | Sikora et al. | |
| 6,460,074 B1 | 10/2002 | Fishkin | |
| 6,463,533 B1 | 10/2002 | Calamera et al. | |
| 6,466,940 B1 | 10/2002 | Mills | |
| 6,477,500 B2 | 11/2002 | Maes | |
| 6,477,580 B1 | 11/2002 | Bowman-Amuah | |
| 6,480,843 B2 | 11/2002 | Li | |
| 6,490,572 B2 | 12/2002 | Akkiraju et al. | |
| 6,493,447 B1 | 12/2002 | Goss et al. | |
| 6,493,694 B1 | 12/2002 | Xu et al. | |
| 6,496,836 B1 | 12/2002 | Ronchi | |
| 6,496,853 B1 | 12/2002 | Klein | |
| 6,499,021 B1 | 12/2002 | Abu-Hakima | |
| 6,505,158 B1 | 1/2003 | Conkie | |
| 6,507,872 B1 | 1/2003 | Geshwind | |
| 6,513,026 B1 | 1/2003 | Horvitz et al. | |
| 6,535,795 B1 | 3/2003 | Zetlmeisl et al. | |
| 6,542,889 B1 | 4/2003 | Aggarwal et al. | |
| 6,553,358 B1 | 4/2003 | Horvitz | |
| 6,560,330 B2 | 5/2003 | Gabriel | |
| 6,560,590 B1 | 5/2003 | Shwe et al. | |
| 6,571,282 B1 | 5/2003 | Bowman-Amuah | |
| 6,574,480 B1 | 6/2003 | Foladare et al. | |
| 6,574,658 B1 * | 6/2003 | Gabber et al. | 709/206 |
| 6,578,025 B1 * | 6/2003 | Pollack et al. | 709/206 |
| 6,584,464 B1 | 6/2003 | Warthen | |
| 6,594,697 B1 | 7/2003 | Praitis et al. | |
| 6,601,026 B2 | 7/2003 | Appelt et al. | |
| 6,607,136 B1 | 8/2003 | Atsmon et al. | |
| 6,611,535 B2 | 8/2003 | Ljungqvist | |
| 6,611,825 B1 | 8/2003 | Billheimer et al. | |
| 6,615,172 B1 | 9/2003 | Bennett et al. | |
| 6,618,727 B1 | 9/2003 | Wheeler et al. | |
| 6,628,194 B1 * | 9/2003 | Hellebust et al. | 340/7.5 |
| 6,636,733 B1 | 10/2003 | Helferich | |
| 6,651,220 B1 | 11/2003 | Penteroudakis et al. | |
| 6,654,726 B1 | 11/2003 | Hanzek | |
| 6,654,815 B1 | 11/2003 | Goss et al. | |
| 6,665,662 B1 | 12/2003 | Kirkwood et al. | |
| 6,675,159 B1 | 1/2004 | Lin et al. | |
| 6,704,728 B1 | 3/2004 | Chang et al. | |
| 6,708,205 B2 * | 3/2004 | Sheldon et al. | 709/206 |
| 6,711,561 B1 | 3/2004 | Chang et al. | |
| 6,714,643 B1 | 3/2004 | Gargeya et al. | |
| 6,714,905 B1 | 3/2004 | Chang et al. | |
| 6,718,367 B1 * | 4/2004 | Ayyadurai | 709/206 |
| 6,732,149 B1 * | 5/2004 | Kephart | 709/206 |
| 6,738,759 B1 | 5/2004 | Wheeler et al. | |
| 6,742,015 B1 | 5/2004 | Bowman-Amuah | |
| 6,744,878 B1 | 6/2004 | Komissarchik et al. | |
| 6,745,181 B1 | 6/2004 | Chang et al. | |

(56) References Cited

U.S. PATENT DOCUMENTS

| | | | |
|---|---|---|---|
| 6,748,387 | B2 | 6/2004 | Garber et al. |
| 6,766,320 | B1 | 7/2004 | Wang et al. |
| 6,785,671 | B1 | 8/2004 | Bailey et al. |
| 6,832,244 | B1* | 12/2004 | Raghunandan ............... 709/206 |
| 6,832,245 | B1* | 12/2004 | Isaacs et al. ................. 709/206 |
| 6,850,513 | B1 | 2/2005 | Pelissier |
| 6,862,710 | B1 | 3/2005 | Machisio |
| 7,007,067 | B1* | 2/2006 | Azvine et al. ............... 709/206 |
| 7,047,242 | B1 | 5/2006 | Ponte |
| 7,051,277 | B2 | 5/2006 | Kephart et al. |
| 7,076,527 | B2* | 7/2006 | Bellegarda et al. .......... 709/206 |
| 7,131,057 | B1 | 10/2006 | Ferrucci et al. |
| 7,200,606 | B2* | 4/2007 | Elkan ........................... 707/102 |
| 7,219,054 | B1* | 5/2007 | Begeja et al. ................ 704/231 |
| 7,272,853 | B2* | 9/2007 | Goodman et al. ............. 726/13 |
| 7,363,590 | B2* | 4/2008 | Kerr et al. .................... 715/759 |
| 7,366,760 | B2* | 4/2008 | Warren et al. ................ 709/206 |
| 7,370,020 | B1 | 5/2008 | Azvine et al. |
| 7,376,701 | B2* | 5/2008 | Bhargava et al. ............ 709/206 |
| 7,409,336 | B2* | 8/2008 | Pak et al. ......................... 704/9 |
| 7,519,668 | B2* | 4/2009 | Goodman et al. ............ 709/206 |
| 7,565,403 | B2* | 7/2009 | Horvitz et al. ............... 709/206 |
| 9,270,625 | B2* | 2/2016 | Alspector ......... G06F 17/30707 |
| 2001/0027463 | A1 | 10/2001 | Kobayashi |
| 2001/0042090 | A1 | 11/2001 | Williams |
| 2001/0047270 | A1 | 11/2001 | Gusick et al. |
| 2001/0056456 | A1 | 12/2001 | Cota-Robles |
| 2002/0029825 | A1 | 3/2002 | Kuehmann et al. |
| 2002/0032715 | A1 | 3/2002 | Utsumi |
| 2002/0049602 | A1 | 4/2002 | Horvitz |
| 2002/0052907 | A1 | 5/2002 | Wakai et al. |
| 2002/0059161 | A1 | 5/2002 | Li |
| 2002/0065953 | A1 | 5/2002 | Alford et al. |
| 2002/0073129 | A1 | 6/2002 | Wang et al. |
| 2002/0078119 | A1 | 6/2002 | Brenner et al. |
| 2002/0078121 | A1 | 6/2002 | Ballantyne |
| 2002/0078257 | A1 | 6/2002 | Nishimura |
| 2002/0083251 | A1 | 6/2002 | Chauvel et al. |
| 2002/0087618 | A1 | 7/2002 | Bohm et al. |
| 2002/0087623 | A1 | 7/2002 | Eatough |
| 2002/0091746 | A1 | 7/2002 | Umberger et al. |
| 2002/0099714 | A1 | 7/2002 | Murray |
| 2002/0103871 | A1 | 8/2002 | Pustejovsky |
| 2002/0107926 | A1 | 8/2002 | Lee |
| 2002/0116463 | A1 | 8/2002 | Hart |
| 2002/0150966 | A1 | 10/2002 | Muraca |
| 2002/0196911 | A1 | 12/2002 | Gao et al. |
| 2003/0028564 | A1 | 2/2003 | Sanfilippo |
| 2003/0046297 | A1 | 3/2003 | Mason |
| 2003/0074397 | A1* | 4/2003 | Morin et al. ................. 709/203 |
| 2003/0233419 | A1* | 12/2003 | Beringer ....................... 709/206 |
| 2003/0236845 | A1* | 12/2003 | Pitsos .......................... 709/206 |
| 2004/0167889 | A1 | 8/2004 | Chang et al. |
| 2004/0177120 | A1* | 9/2004 | Kirsch ......................... 709/206 |
| 2004/0205135 | A1* | 10/2004 | Hallam-Baker ............. 709/206 |
| 2004/0225653 | A1 | 11/2004 | Nelken et al. |
| 2004/0254904 | A1 | 12/2004 | Nelken et al. |
| 2005/0187913 | A1 | 8/2005 | Nelken et al. |

FOREIGN PATENT DOCUMENTS

| | | |
|---|---|---|
| EP | 0 304 191 | 2/1999 |
| JP | 09106296 | 4/1997 |
| WO | 0036487 | 6/2000 |
| WO | WO 00/36487 A2 | 6/2000 |
| WO | 01/84373 | 8/2001 |
| WO | 01/84374 | 8/2001 |

OTHER PUBLICATIONS

Browning, Brandon. "Getting Rid of Spam." Linux Journal. Mar. 1998. Specialized Systems Consultants Inc. 4 pages.*
Cranor, Lorrie Faith et al. "Spam!". Communications of the ACM. Aug. 1998. ACM Press. 74-83.*
Schneider, Karl-Michael. "A Comparison of Event Models for Naïve Bayes Anti-Spam E-Mail Filtering." Proceedings of the tenth conference on European chapter of the Association for Computational Linguistics. vol. 1. 307-314. Apr. 2003.*
Hall, Robert J. "How to Avoid Unwanted Email". Communications of the ACM. vol. 41, No. 3. ACM Press. Mar. 1998. 88-95.*
Chai, Kian Ming Adam et al. "Bayesian online classifiers for text classification and filtering." Proceedings of the 25th annual international ACM SIGIR conference on Research and development in information retrieval. ACM Press. Aug. 2002. 97-104.*
Breese et al., "Empirical Analysis of Predictive Algorithms for Collaborative Filtering," Proc. of the 14th Conf. on Uncertainty in Artificial Intelligence, Jul. 1998.
Czerwinski et al., "Visualizing Implicit Queries for Information Management and Retrieval," Proc. of CHI 1999; ACM SIGCHI Conf. on Human Factors in Computing Systems, 1999.
Dumais et al., "Inductive Learning Algorithms and Representations for Task Categorization," Proc. of 7th Intl. Conf. on Information & Knowledge Management, 1998.
Horvitz, "Principles of Mixed-Initiative User Interfaces," Proc. of CHI 1999; ACM SIGCHI Conf. on Human Factors in Computing Systems, 1999.
Horvitz et al., "Display of Information for Time-Critical Decision Making," Proc. of the 11th Conf. on Uncertainty in Artificial Intelligence, Jul. 1995.
Horvitz et al., "The Lumiere Project: Bayesian User Modeling . . . ," Proc. of the 14th Conf. on Uncertainty in Artificial Intelligence, Jul. 1998.
Horvitz et al., "Time-Dependent Utility and Action Under Uncertainty," Proc. of the 7th Conf. on Uncertainty in Artificial Intelligence, Jul. 1991.
Horvitz et al., "Time-Critical Action: Representations and Application," Proc. of the 13th Conf. on Uncertainty in Artificial Intelligence, Jul. 1997.
Koller et al., "Toward Optimal Feature Selection," Proc. of 13th Conf. on Machine Learning, 1996.
Lieberman, "Letizia: An Agent That Assists in Web Browsing," Proc. of International Joint Conference on Artificial Intelligence, 1995.
Platt, "Fast Training of Support Vector Machines Using Sequential Minimal Optimization," Advances in Kernel Methods: Support Vector Learning, MIT Press, Cambridge, MA, 1999.
Platt, "Probabilistic Outputs for Support Vector Machines & Comparisons to Regularized Likelihood Methods," Adv. in Large Margin Classifiers, MIT Press, Cambridge, MA, 1999.
Sahami et al., "A Bayesian Approach to Filtering Junk E-Mail," Amer. Assoc. for Art. Intell. Technical Report WS-98-05, 1998.
Cohen, "Learning Rules that Classify E-Mail," AT&T Laboratories, 1996.
Lewis, "Evaluating and Optimizing Autonomous Text Classification Systems," ACM SIGIR, 1995.
Lewis et al., "Training Algorithms for Linear Text Classifiers," ACM SIGIR, 1996.
Apte et al., "Automated Learning of Decision Rules for Text Categorization," ACM Transactions on Information Systems, vol. 12, No. 3, 1994.
Losee, Jr., "Minimizing Information Overload: The Ranking of Electronic Messages," Journal of Information Science 15, 1989.
Joachimes, "Text Categorization with Support Vector Machines: Learning with Many Relevant Features," Universitat Dortmund, Germany, 1998.
Apte, C. et al., "Automated Learning of Decision Rules for Text Categorization", IBM Research Report RC 18879, to appear in ACM Transactions on Information Systems, vol. 12, No. 3, pp. 233-251, 1994.
Breese, John S et al., "Empirical Analysis of Predictive Algorithms for Collaborative Filtering", Proceedings of the Fourteenth Conference on Uncertainty in Artificial Intelligence, Madison, WI, Jul. 1998, Morgan Kaufman Publisher.
Cohen, William W., "Learning Rules That Classify E-Mail", In Proceedings of the 1996 AAAI Spring Symposium on Machine Learning in Information Access.

(56) References Cited

OTHER PUBLICATIONS

Czerwinski, Mary et al., "Visualizing Implicit Queries for Information Management and Retrieval", Proceedings of CHI '99, ACM SIGCHI Conference on Human Factors in Computing Systems, May 15-20, 1999, pp. 560-567.
Dumais, Susan et al., "Inductive Learning Algorithms and Representations for Text Categorization", Proceedings of Seventh International Conference on Information and Knowledge Management (CIKM98), Bethesda MD, Nov. 1998, ACM Press, pp. 148-155.
Horvitz, Eric et al., "Display of Information for Time-Critical Decision Making", Proceedings of the Eleventh Conference on Uncertainty in Artificial Intelligence, Montreal, Canada, Aug. 1995, Morgan Kaufmann Publishers (San Francisco, CA), pp. 296-305. http://research.microsoft.com/~horvitz/vista.htm.
Horvitz, Eric, "Principles of Mixed-Initiative User Interfaces", Proceedings of CHI 1999; ACM SIGCHI Conference on Human Factors in Computing Systems, 1999.
Horvitz, Eric et al., "The Lumiere Project: Bayesian User Modeling for Inferring the Goals and Needs of Software Users", Proceedings of the Fourteenth Conference on Uncertainty in Artificial Intelligence, Madison, WI, Jul. 1998, Morgan Kaufmann Publishers, pp. 256-265. http://research.microsoft.com/~horvitz/lumiere.htm.
Horvitz, Eric et al., "Time-Critical Action: Representations and Application", Proceedings of the Thirteenth Conference on Uncertainty in Artificial Intelligence, Jul. 1997.
Horvitz, Eric et al., "Time-Dependent Utility and Action Under Uncertainty", In Proceedings of Seventh Conference on Uncertainty in Artificial Intelligence, Los Angeles, CA, pp. 151-158, Morgan Kaufman (San Mateo, CA), Jul. 1991.
Joachims, Thorsten, "Text Categorization With Support Vector Machines: Learning With Many Relevant Features", In Proceedings 10th European Conference on Machine Learning (ECML), Springer Verlag, 1998. http://www-ai.cs.uni-dortmund.de/KOKIMENTE/Joachims_97a.ps.gz.
Koller, Daphne et al., "Toward Optimal Feature Selection", Proceedings of the Thirteenth Conference on Machine Learning, pp. 284-292, 1996.
Lewis, David D., "Evaluating and Optimizing Autonomous Text Classification Systems", ACM SIGIR '95, Seattle, WA, USA, pp. 246-254, 1995. ACM 0-89791-714-6/95/07.S3.50.
Lewis, David D., et al., "Training Algorithms for Linear Text Classifiers", ACM SIGIR '96, Zurich, Switzerland, pp. 298-306, 1996. ACM 0-89791-792-8/96/08.S3/50.
Lieberman, Henry, "Letizia: An Agent That Assists in Web Browsing", International Joint Conference on Artificial Intelligence (IJCAI), Montreal, Canada, Aug. 1995.
Losee, Robert M., "Minimizing Information Overload: the Ranking of Electronic Messages", Journal of Information Science 15, 1989, pp. 179-189. 0165-5515/89/S3.50, 1989, Elsevier Science Publishers B.V.
Platt, John C., "Fast Training of Support Vector Machines Using Sequential Minimal Optimization", To appear in: B. Scholkopf, C. Burges, and A. Smola (Eds.) "Advances in Kernel Methods: Support Vector Learning", MIT Press, Cambridge, MA, London, England, 1999, pp. 185-208. ISBN 0-262-19416-3.
Platt, John C., "Probabilistic Outputs for Support Vector Machines and Comparisons to Regularized Likelihood Methods", To appear in: Alexander J. Smola et al. (Eds.) "Advances in Large Margin Classifiers", MIT Press, Cambridge, MA, Mar. 26, 1999, pp. 1-11.
Sahami, Mehran, et al., "A Bayesian Approach to Filtering Junk E-Mail", American Association for Artificial Intelligence Technical Report WS-98-05, Workshop on Text Categorization, Jul. 1998. http://robotics.stanford.edu/users/sahami/papers-dir/spam.ps.
"Grammar-like Functional Rules for Representing Query Optimization Alternative," 1998 ACM, pp. 18-27.
Khan et al., "Personal Adaptive Web Agent: A Tool for Information Filtering," Canadian Conference on Electrical and Computer Engineering, vol. 1, May 25, 1997, pp. 305-308.
Davies et al., "Knowledge Discovery and Delivery," British Telecommunications Engineering, London, GB, vol. 17, No. 1, Apr. 1, 1998, pp. 25-35.
Persin, "Document Filtering for Fast Ranking," Sigir 94. Dublin, Jul. 3-6, 1994, Proceedings of the Annual International ACM-Sigir Conference on Research and Development in Information Retrieval, Berlin, Springer, DE, vol. CONF. 17, Jul. 3, 1994, pp. 339-348.
Han et al., "WebACE: A Web Agent for Document Categorization and Exploration," Proceedings of the $2^{nd}$ International Conference on Autonomous Agents Minneapolis/St. Paul, MN, May 9-13, 1998, Proceedings of the International Conference on Autonomous Agents, New York, NY, May 9, 1998, pp. 408-415.
Shimazu et al., "CAPIT: Natural Language Interface Design Tool with Keyword Analyzer and Case-Based Parser," NEC Research and Development, Nippon Electric Ltd., Tokyo, JP, vol. 33, No. 4, Oct. 1, 1992, pp. 679-688.
Computer Dictionsry, Microsoft Press, 1997, Third Edition, p. 192.
Webster's Third New International Dictionary, G.&C. Meriam Company, 1961, pp. 538, 834, 1460.
Moore et al., "Web Page Categorization and Feature Selection Using Association Rule and Principal Component Clustering," Proceedings of the $7^{th}$ Workshop on Information Technologies and Systems, Dec. 1997, 10 pages.
Mase, "Experiments on Automatic Web Page Categorization for IR Systems," Technical Report, Stanford University, 1998, pp. 1-12.
Berners-Lee et al., "The Semantic Web," Scientific American.com, May 17, 2001, 9 pages.
Brasethvik et al., "A Conceptual Modeling Approach to Semantic Document Retrieval," Proceedings of the $14^{th}$ International Conference on Advanced Information Systems Engineering, May 27-31, 2002, pp. 167-182.
Firepond eService Provider, http://www.firepond.com/products/eserviceperformer, 2 pages.
Banter White Paper:, "Natural Language Engines or Advanced Customer Interaction," by Banter Inc., pp. 1-13.
Banter Technology RME, "The Foundation for Quality E-Communications," Technical White Paper, pp. 1-9.
Webster's Computer Internet Dictionary, 3rd Edition, P.E. Margolis, 1999, 3 pages.
Morelli et al., "Predicting Technical Communication in Product Development Organizations," IEEE Transactions on Engineering Management, vol. 42, issue 3, Aug. 1995, pp. 1-16.
Parmentier et al., "Logical Structure Recognition of Scientific Bibliographic References," $4^{th}$ Int'l. Conf. on Document Analysis and Recognition, vol. 2, Aug. 18-20, 1997, pp. 1072-1076.
Kalogeraki et al., "Using Multiple Feedback Loops for Object Profiling . . . ," IEEE Int'l Symposium on Object-Oriented Real-Time Distributed Computing, May 2-5, 1999, 10 pages.
Johnson et al., "Adaptive Model-Based Neural Network Control," IEEE Int'l Conf. on Robotics and Automation, May 13-18, 1990, pp. 1704-1709.
McKinnon et al., "Data Communications and Management of a Distributed Network of Automated Data Acquisition Systems," 1997 IEEE Nuclear Science Symp., Nov. 1997, pp. 730-733.
searchCRM.com Definitions (contact center), http://www.searchcrm.techtarget.com. 1 page.
"Transforming Your Call Center Into a Contact Center: Where Are You? Trends and Recommendations," An IDC Executive Brief (#33), Jun. 2001, pp. 1-7.
Hawkins et al., "The Evolution of the Call Center to the 'Customer Contact Center'", ITSC White Paper, Feb. 2001, pp. 1-30.
Computer Dictionary, Microsoft Press, 1997, Third Edition, p. 192.
Webster's Third New International Dictionary, G.&C. Meriam Company, 1961, pp. 538,834, 1460.

\* cited by examiner

| Junkmail | Score | Priority | From | Subject | Received |
|---|---|---|---|---|---|
| | | | | | |
| 3 | 55 | Med | John Doe | Customer X | 2/5/2003 |
| 85 | 15 | Low | Marketing Co. | Lose Weight Now! Only $29.95/mo. | 2/5/2003 |
| 12 | 72 | High | Jane Smith | Your Order #123 from Vendor A | 2/4/2003 |
| 48 | 31 | Med | Bob Jones | FW: Check this out! | 2/4/2003 |

FIG. 5

SYSTEM AND METHOD FOR INCREASING EMAIL PRODUCTIVITY

CROSS-REFERENCE TO RELATED APPLICATIONS

This application is a continuation of patent application Ser. No. 09/602,588 filed on Jun. 21, 2000, by the same title and inventor.

This application is a continuation-in-part of U.S. patent application Ser. No. 10/112,230, entitled "System and Method for Determining a Set of Attributes Based on Content of Communications," filed Mar. 27, 2002. This application is also related to U.S. patent application Ser. No. 09/754,179, entitled "System and Method for Electronic Communication Management," filed Jan. 3, 2001. The subject matter of the related applications is hereby incorporated by reference. The related applications are commonly assigned.

BACKGROUND OF THE INVENTION

1. Field of the Invention

This invention relates generally to electronic mail (email) and relates more particularly to a system and method for increasing email productivity.

2. Description of the Background Art

Electronic mail (email) has become an important tool for both business and personal communication, and its use will likely become even more critical in the future. Many professionals spend a good part of their workday reading and drafting email messages for various purposes. High-volume email users, for example professionals with publicly-available email addresses, may receive hundreds of email messages a day, and can spend several hours each day dealing with them. The sheer volume of received email messages challenges the productivity of any professional.

Email users often receive junkman, also known as unsolicited commercial email or spam. Most users are not interested in such messages and routinely delete them unread. However, some junkman messages are not easily identified as such from the sender or the subject line, and a user may waste time opening and reading a message only to discover that it is unwanted junkman. Email users also often receive personal messages such as jokes, invitations, and notes from friends. Some users may consider these types of messages as junkman, while others enjoy sending and receiving such messages.

For most business users, the bulk of received email messages are work-related, some of which have a higher priority than others. For example, an email message from a key customer is likely to be of a higher priority than a message from a co-worker. Also, a message from a user's supervisor is likely to be of a higher priority than a message that is a reminder of a regularly scheduled meeting. In addition, messages regarding certain topics may be regarded as having a higher priority than messages regarding a different topic. Each user may have a different determination of which messages have a higher priority, and this determination of priority may change over time.

SUMMARY OF THE INVENTION

An email productivity module interacts with an existing email application to perform a variety of functions, such as prioritizing and sorting email messages and filtering junk email messages. The email productivity module performs these functions and others by first analyzing the content of each message using a content analysis engine that implements natural language text classification techniques. Performance of the email productivity module is maintained and/or improves over time by learning from feedback generated by a user's actions taken in connection with email messages. Feedback may be utilized to adapt one or more knowledge bases, which may be stored locally or at another computing device located on a computer network. A knowledge base is a collection of information used by the system to analyze and classify messages. The knowledge base may include any combination of statistical information about messages, domain or language in general, as well as rules, lexicons, thesauri, anthologies and other natural language processing elements known in the art. The knowledge base may additionally include thresholds, likelihood tables, and other information used to classify a message.

The content analysis engine analyzes the content of the message. A prioritization module assigns a priority score and a priority label to the message based on its content. In one embodiment, the priority score is a whole number from 0 to 100, and the priority label is a designation such as high, medium, or low. The user provides feedback to the email productivity module by either accepting the prioritization assigned to the message, changing the priority label (e.g., changing a low priority message to high), or providing feedback by some other means to establish the priority of a selected message. The email productivity module may also infer information about the priority of the message from the actions of the user (implicit feedback).

In connection with the prioritization function, the email productivity module may advantageously provide a mechanism for filtering low-priority (but otherwise legitimate) email messages having content that is relatively unimportant to the recipient and which does not require a response therefrom. These low-priority e-mail messages, which are known colloquially in the art as "occupational spam," may consist of enterprise-wide announcements, reminders, status reports, and the like, and may constitute a significant portion of the total number of emails received by employees, particularly high-level executives. However, existing junkmail filtering software is not capable of detecting and filtering occupational spam, and so a user may spend a substantial amount of time reading through such messages and taking appropriate action, such as deleting the messages or moving them to a folder for later review. Embodiments of the present invention address this deficiency by generating a priority score for each message, and then executing a predetermined action, such as deleting the message or moving it to a specified folder, if the priority score falls below a predetermined threshold representative of occupational junkmail having little importance and/or urgency to the user.

The sorting function determines a set of suggested folders for storing incoming messages. For each incoming message, the content analysis engine analyzes the content of the message. A message sorting module determines a confidence score for the message based on content for each available folder and lists the top scoring folders in descending order. The user provides feedback to the email productivity module by moving the message into a folder, or by other means of explicit or implicit feedback. In one embodiment, the user may enable the email productivity module to automatically move a message into a folder, for example if the message score for that folder exceeds a threshold.

The junkman identifying function determines whether a message qualifies as junkmail (also known as unsolicited commercial email or spam). The content analysis engine analyzes the content of each incoming message and a junkmail module determines a junkmail score based on the content of the message. The user provides feedback by moving the message to a junkmail folder, which provides positive feedback, or moving the message to a folder not associated with junkmail, which provides negative feedback. The user may also provide explicit feedback to the email productivity module by manually indicating that the message is junkmail or non-junkmail, for example by a keystroke or by clicking on a button. In one embodiment, the user may enable the email productivity module to automatically move a message into the junkmail folder or delete the message if that message's junkman score exceeds a threshold.

The email productivity module may modify the user interface of the email application. The inbox view includes additional fields to show the prioritization score, prioritization level, and junkmail score. In one embodiment, the user interface also includes a toolbar with buttons related to the functions of the email productivity tool. For example, the toolbar includes a junkman button for identifying a message as junkmail, a number of buttons for assigning a priority level to a message, and a drop down list of suggested folders.

The email productivity module may also provide an intelligent search function that allows a user to select one or more messages and search stored messages in every folder to find messages with similar content ("search by example").

BRIEF DESCRIPTION OF THE DRAWINGS

FIG. 5 is a diagram of one embodiment of the message window of FIG. 4, according to the invention.

DETAILED DESCRIPTION OF THE INVENTION

Figure 1:
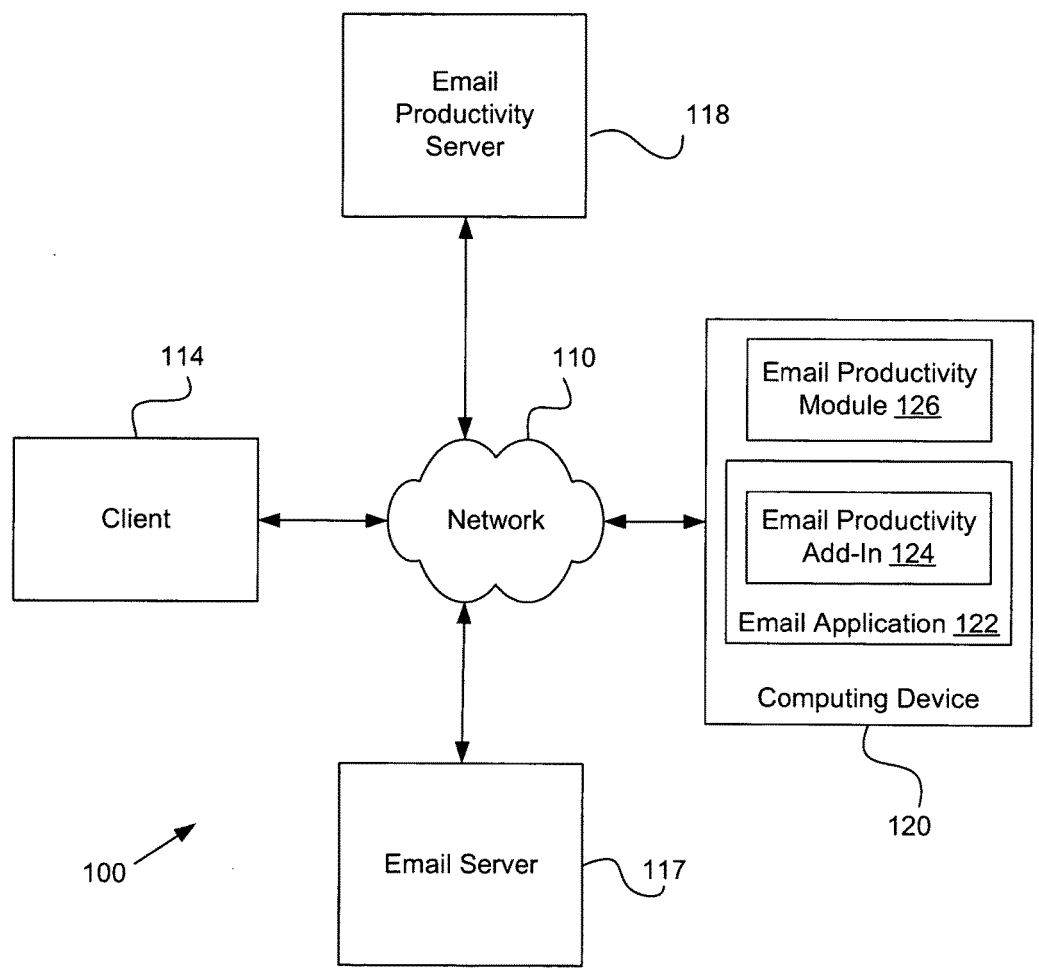
FIG. 1 is a block diagram of one embodiment of an electronic communications network, according to the invention.

FIG. 1 is a symbolic diagram of an implementation of one embodiment of the invention in a networked computing environment 100. A computing device 120 communicates over a network 110 with other computing devices, such as client computer 114. Network 110 may be any appropriate type of network or combination of networks, for example a local area network (LAN), a wide area network (WAN), a wireless network, a home network, the public switched telephone (PSTN), or the public Internet. Computing device 120 may take the form of any suitable device capable of sending an receiving email message, for example a desktop computer, a laptop computer, a set-top box, a handheld computing device, a handheld messaging device, a mobile telephone, or a dedicated email appliance. In a typical network environment, computing device 120 received and sends email messages via at least one email server 117, which performs a standard set of store-and-forward, addressing and routing functions. Computing device 120 may also communicate with an email productivity server 118 to effect various productivity functions, as is described in further detail below.

Computing device 120 is provided with storage and a processor for storing and executing an email application 122 having an email productivity add-in 124, and an email productivity module 126. Email application 122 may be, for example, a widely utilized commercial application such as Microsoft Outlook®. Email productivity add-in 124 and email productivity module 126 cooperate to process incoming email messages before the messages are displayed by email application 122. More specifically, email productivity module 126 analyzes the content of incoming email messages and accordingly generates a set of scores and other attributes characterizing the content. Email productivity add-in 124 adds fields containing these scores and attributes to the message so that they may be displayed to the user by email application 122, or so that the presentation of incoming email messages in the user interface may be modified in accordance with the associated scores and attributes. Email productivity add-in 124 may also modify the user interface of email application 122 to allow a user to access functions of email productivity module 126. The contents and functionalities of email productivity module 126 are further discussed in conjunction with FIG. 2.

Figure 2:
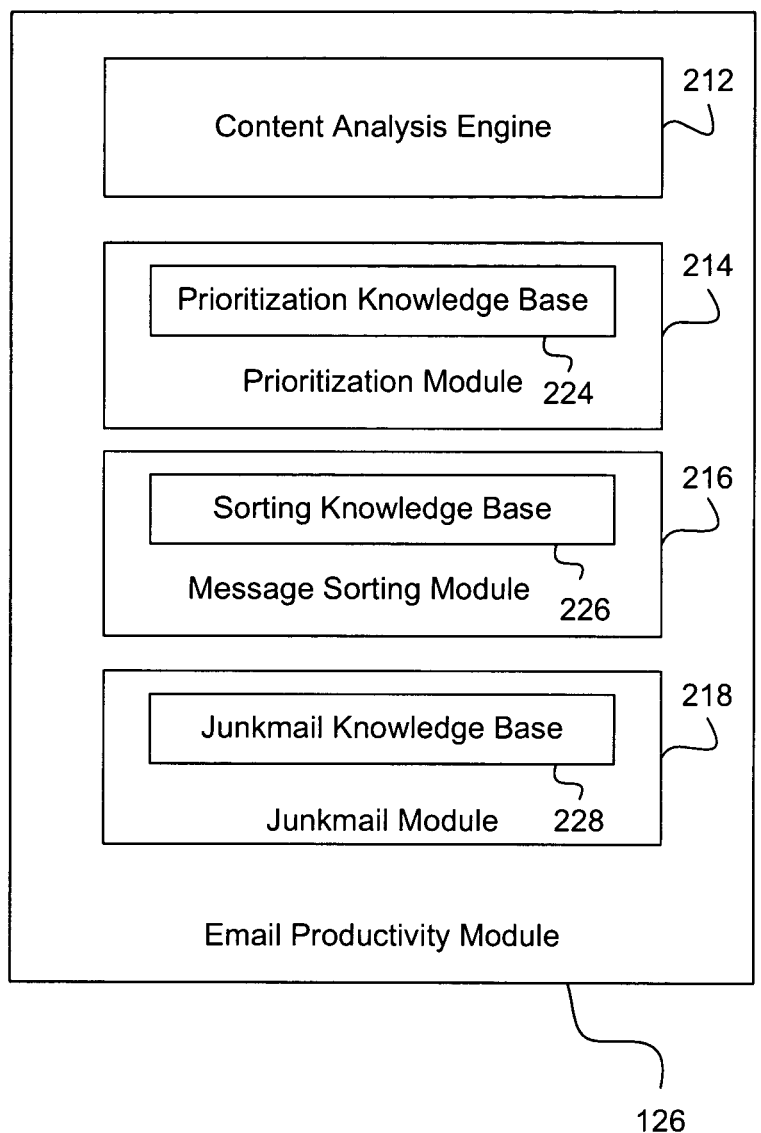
FIG. 2 is a block diagram of one embodiment of the email productivity module of FIG. 1, according to the invention.

FIG. 2 is a block diagram of one embodiment of the email productivity module 126 of FIG. 1. Email productivity module 126 includes, but is not limited to, a content analysis engine 212, a prioritization module 214, a message sorting module 216, and a junkmail module 218. Prioritization module 214 has an associated prioritization knowledge base 224, message sorting module 216 has an associated sorting knowledge base 226, and junkmail module 218 has an associated junkman knowledge base 228. It should be noted that the architecture depicted by FIG. 2, in which the functions of productivity module 126 are distributed among four separate and distinct component structures, is provided by way of example only, and that the productivity module may instead be implemented having a greater or lesser number of component structures.

Content analysis engine 212 analyzes the content of the message using language processing techniques to produce content information representative of the content of the email message. The content information may include, without limitation, scoring vectors or matrices indicative of the presence, absence, or incidence of concepts or terms in the message, or of the source and/or recipients of the email message. As used herein, the "content" of the message is intended to include without limitation all lexical and syntactical information in the body of the message, any attachments, and in all message headers such as sender, recipient, reply-to address, carbon copy (cc), subject, date, and time.

Prioritization module 214 is configured to generate priority information for email messages received or stored by computing device 120. More specifically, prioritization module 214 operates in conjunction with content analysis engine 212 to assign a priority score and a priority level to email messages. Content analysis engine 212 and prioritization module 214 apply the content information to prioritization knowledge base 224 to determine a priority score for the message. Prioritization module 214 then assigns a priority level to the email message based on the priority score. In an illustrative implementation, priority scores are whole numbers in a range of 0-100, and available priority levels are low, medium, and high. Scores 0-29 correspond to the low level, scores 30-70 correspond to the medium level, and scores 71-100 correspond to the high level. Other ranges of priority scores and other priority levels are within the scope of the invention. Additionally and/or alternatively, priority scores generated by the prioritization module may take the form of vectors, matrices, sets, or other data structures, wherein the universe of possible priority scores includes at least three different values or states.

Prioritization knowledge base 224 is a collection of information used by email productivity module 126 to make determinations regarding the priority of email messages. Prioritization knowledge base 224 may include any combination of statistical information about messages, domain or language in general, as well as rules, lexicons, thesauri, anthologies, and other natural language processing elements well known in the art. Prioritization knowledge base 224 may also include thresholds, likelihood tables, and any other information used to classify a message. Thresholds may be designated by the user, predetermined by the designers of email productivity module 126, or automatically adjusted by email productivity module 126. In one embodiment, prioritization knowledge base 224 stores prioritization information as models arranged in a branch structure, wherein each branch is a model corresponding to a priority level, e.g. the knowledge base may include a first model for high priority messages, a second model for medium priority messages, and a third model for low-priority messages. Prioritization module 214 applies the content information of a received message to each of the models in prioritization knowledge base 224 to determine the priority score, which reflects the relative priority of the message. Each model in prioritization module 214 may have the same threshold or each model may have a uniquely assigned threshold.

It should be noted that the inclusion in the present invention of the prioritization module and its attendant functionality advantageously enables users to identify legitimate but low-priority email messages (which would not be filtered or otherwise flagged by conventional spam filtering software), and to take appropriate action with respect to the low-priority messages, such as deleting them or storing them in a folder for subsequent review at a convenient time. These legitimate but low-priority email messages, which have been referred to as "occupational spam", may take the form of enterprise-wide announcements, reminders, status reports, and the like, and may constitute a significant portion of the total number of emails received by employees, particularly high-level executives.

Message sorting module 216 operates in conjunction with content analysis engine 212 to determine a set of suggested folders for a message. The set of suggested folders represent one or more folders in which are stored other emails having similar content, and in which the user would be most likely store the message. Content analysis engine 212 applies the content information of the message to sorting knowledge base 226 to determine the set of suggested folders for the message. Sorting knowledge base 226 is a collection of information used by email productivity module 126 to analyze and classify messages. Sorting knowledge base 226 may include any combination of statistical information about messages, domain or language in general, as well as rules, lexicons, thesauri, anthologies, and other natural language processing elements well known in the art. Sorting knowledge base 226 may also include thresholds, likelihood tables, and any other information used to classify a message. Thresholds may be designated by the user, predetermined by the designers of email productivity module 126, or automatically adjusted by email productivity module 126. In one embodiment, sorting knowledge base 226 is organized in a branched structure and includes on each branch a model corresponding to a folder in email application 122 or other class characterizing the content of email messages. Message sorting module 216 generates a score in connection with each model in sorting knowledge base 226, the score being representative of the likelihood that the email should be classified in the folder to which the model corresponds. Message sorting module 216 then identifies a set of suggested folders. In one embodiment, the set of suggested folders includes the top ten highest scoring folders. Each model in sorting knowledge base 226 may have the same threshold or each model may have a uniquely assigned threshold.

Junkmail module 218 operates in conjunction with content analysis engine 212 to determine a junkmail score for each message. Content analysis engine 212 applies the content information of the message to junkmail knowledge base 228. Junkman knowledge base 228 is a collection of information used by email productivity module 126 to analyze and classify messages. Junkmail knowledge base 228 may include any combination of statistical information about messages, domain or language in general, as well as rules, lexicons, thesauri, anthologies, and other natural language processing elements well known in the art. Junkman knowledge base 228 may also include thresholds, likelihood tables, and any other information used to classify a message. Thresholds may be designated by the user, predetermined by the designers of email productivity module 126, or automatically adjusted by email productivity module 126. In one embodiment, junkman knowledge base 228 is organized into a branched structure and includes on one branch a junk model and at the other a not junk model. The score generated when the content information is applied to the junk model is the junkmail score for the message. In one embodiment, the junkmail score is a whole number in a range of 0-100. The higher the junkman score, the higher the probability that the message is junkmail according to the criteria in junkmail knowledge base 228. Each model in junkmail knowledge base 228 may have the same threshold or each model may have a uniquely assigned threshold.

Prioritization module 214, message sorting module 216, and junkmail module 218 supply the priority score and priority level, the set of suggested folders, and the junkmail score, respectively, to email productivity add-in 124. Email productivity add-in 124 attaches fields for the priority score, priority level, set of suggested folders, and junkmail score to the message for display by email application 122. The user interface of email application 122 modified by email productivity add-in 124 is discussed below in conjunction with FIGS. 4 & 5.

Prioritization knowledge base 224, sorting knowledge base 226, and junkmail knowledge base 228 are updated by feedback from user input to email application 122. Email productivity add-in 124 monitors user inputs to email application 122 and reports these inputs as feedback to email productivity module 126. Prioritization module 214 may update prioritization knowledge base 224 using both explicit and implicit feedback. In other words, the terms "feedback" and "user action" are not limited to affirmative actions taken by the user, but rather extend to actions wherein the user accepts the result produced by the productivity module and/or refrains from modifying the result. The user may provide explicit feedback, for example, by changing a priority level that has been assigned to a message. For example, if a message has been assigned a priority level of low and the user feels that the message has a higher priority, then the user can assign a new priority level to the message, such as high. When the user assigns a new priority level to a message, prioritization module 214 assigns the message a priority score in the range of scores for that priority level. In one embodiment, prioritization module 214 assigns a score in the middle of the range of possible scores for the priority level assigned by the user. If the user does not provide explicit priority feedback for a message and does not delete the message but instead takes another action with respect to the email, implicit feedback may be provided to prioritization knowledge base 224. If the user reads or otherwise deals with messages in order of the relative priority scores, this action provides positive feedback to prioritization knowledge base 224. If the user reads messages in an order other than in descending order of priority score, this user action may provide negative feedback to prioritization knowledge base 224. Thus, prioritization knowledge base 224 is updated with feedback for every message received by email application 122. Updating of the prioritization knowledge base may be effected, for example, by adapting the models corresponding to each priority level in accordance with the feedback generated by user action. The feedback is preferably supplied to the prioritization module immediately after the relevant user action is taken to allow real-time adaptation of the models, thereby improving the accuracy and reliability of the prioritization function.

Message sorting module 216 updates sorting knowledge base 226 using feedback generated by user action, for example moving the received message to a selected folder for storage. When the user moves a message to a folder, email productivity add-in 124 provides explicit feedback to message sorting module 216. The user can move the message to one of the set of suggested folders or to any other folder, or create a new folder. When the user creates a new folder in email application 122, message sorting module 216 creates a new model in sorting knowledge base 226. Email productivity module 126 preferably learns in real time how the user prefers to store messages by updating sorting knowledge base 226 with feedback for each message moved into a folder.

Categories may be used to search for or locate messages, whether or not used in conjunction with a keyword search engine. In one embodiment, message sorting module 216 operates in conjunction with a category function native to email application 122. If the category function is enabled, a category is created for each folder of email application 122 and the user designates a category threshold. If a message receives one or more folder scores that exceeds the category threshold, then message sorting module 216 assigns the categories for these folders to the message. Although a message is stored in only one folder, the message may be assigned a plurality of categories. The user is then able to locate messages by category. Other implementations of a category function are within the scope of the invention, for example a category function in which the category names do not correspond to a folder of email application 122.

In one embodiment, message sorting module 216 includes an automove function that, when enabled by the user, will automatically move a received message to the highest scoring folder when the score for that folder exceeds a user-designated threshold value. For example, if message sorting module 216 determines a highest scoring folder with a score that exceeds the threshold for a received message, message sorting module 216 will notify email productivity add-in 124 to cause email application 122 to move the received message directly to the highest scoring folder instead of the inbox. When a message has been automoved to a folder, email productivity add-in 124 may provide implicit feedback to message sorting module 216 if the user reads the message and does not move it to another folder. If the user does move the message to a different folder, email productivity add-in 124 provides explicit feedback to message sorting module 216.

Junkmail module 218 updates junkmail knowledge base 228 using explicit and implicit feedback generated by user actions. The user provides explicit feedback to junkman module 218, for example, by taking an action indicating that a message is junkmail, for example by moving it to a junkmail folder. If the user reads a message and does not delete it or indicate that it is junkmail, junkmail module 218 receives implicit feedback that the message is not junkmail. If the user moves a message out of the junkman folder, junkmail module 218 receives implicit feedback that the message is not junkmail. If the user deletes a message from the junkmail folder, junkman module 218 receives implicit feedback that the message is junkmail. In one embodiment, junkmail module 218 has an automove function that, when enabled by the user, will automatically move a received message to a junkman folder if the junkmail score for that message exceeds a user-designated threshold. Email productivity module 126 learns in real-time the user's criteria for junkmail by updating junkmail knowledge base 228 with feedback for each received message.

In one embodiment, junkmail knowledge base 228 may be updated using information provided from an external source. For example, an email service provider could implement a service whereby it generates rules and other information for filtering junkmail messages. Junkmail module 218 may, upon receipt of such rules and other information (which may supplied, for example, through network 110), update junkmail knowledge base 228 in accordance with the received information.

In one embodiment, email productivity module 126 includes an intelligent search function. The user may select a message, and instruct email productivity module 126 to find other similar messages. Content analysis engine 212 analyzes the selected message to identify concepts of the message, and then analyzes stored messages in all folders to identify similar messages.

In one embodiment, email productivity module 126 includes a folder management function. When enabled by the user, email productivity module 126 will analyze the content of previously stored messages in each folder and identify messages that may not belong in a particular folder according to the information in sorting knowledge base 226. The user may then decide to move such an identified message to a folder suggested by email productivity module 126, move the message to some other folder, or not move the message. Each of these actions provides feedback to message sorting module 216 and sorting knowledge base 226. The folder management function may also suggest to the user that certain folders be combined into a single folder, or a single folder be split up into multiple folders.

In one embodiment, email application 122 may forward copies of email messages to a wireless device. Email productivity module 126 can enhance this function by selectively forwarding copies of messages to a wireless device based on analysis of content. For example, the user may designate that messages that have a priority level of high should be forwarded to a wireless device. In another example, the user may designate that only messages that are automoved to a certain folder are to be copied to a wireless device. Email productivity module 126 can also enhance other functions of email application 122, for example a text-to-voice function that only converts messages having a high priority level to voice.

Email productivity module 126 may perform other automatic operations based on results generated by content analysis engine 212 and other components of the email productivity module. Such other automatic operations may include auto-forward to another email address, notification to the user that a message from a particular address has been received, automatically using a web browser to open an embedded hyperlink, or automatically opening an attachment.

It is noted that although the embodiment of the invention described and depicted herein includes prioritization, sorting, and junkmail filtering functions, this embodiment is intended as illustrative rather than limiting, and other embodiments within the scope of the invention may include a subset or superset of these functions.

Figure 3:
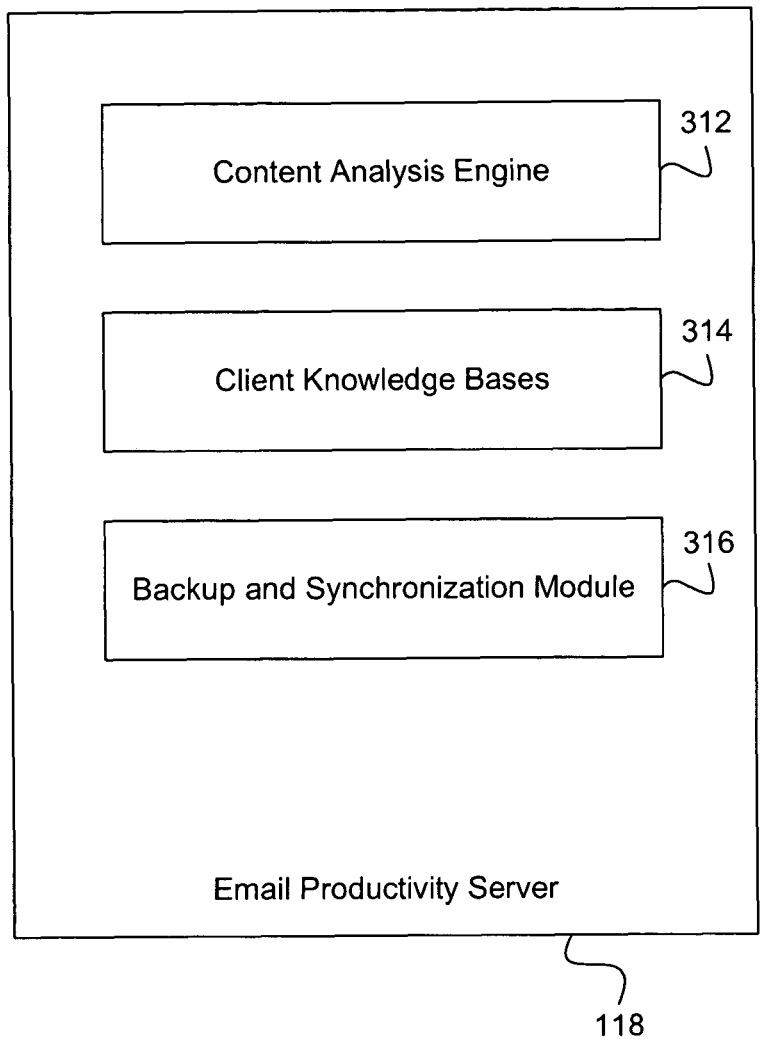
FIG. 3 is a block diagram of one embodiment of the email productivity server of FIG. 1, according to the invention.

FIG. 3 is a block diagram of one embodiment of the email productivity server 118 of FIG. 1, according to the invention. Email productivity server 118 includes, but is not limited to, a content analysis engine 312, client knowledge bases 314, and a backup and synchronization module 316. In the FIG. 3 embodiment of email productivity server 118, content analysis engine 312 performs the functions of content analysis engine 212 (FIG. 2) for clients that do not have content analysis engine 212 (i.e., for "thin clients" having limited storage and/or data processing capabilities). Client knowledge bases 314 include a prioritization knowledge base, a sorting knowledge base, and a junkmail knowledge base for each client in network 100 that does not have resident knowledge bases. It will be appreciated that two or more clients may share a common set of knowledge bases, or alternatively the productivity server 118 may store a separate knowledge base for each client. In another embodiment, client knowledge bases 314 includes a global junkman knowledge base that includes information adapted in accordance with the information in the clients' junkmail knowledge bases 228. This architecture allows feedback regarding junkmail to be utilized by each client in network 100, thereby improving filtering accuracy for all clients.

Backup and synchronization module 316 is configured to copy the clients' knowledge bases as a backup in case of failure at one of the clients in network 100. Backup and synchronization module 316 is also configured to synchronize the information in the clients' junkmail knowledge bases 228. Backup and synchronization module 316 may also manage licensing of email productivity module 216 and email productivity add-in 214 on clients 120. Backup and synchronization module 316 may also synchronize the knowledge bases for users that use multiple instances of email application 122.

Figure 4:
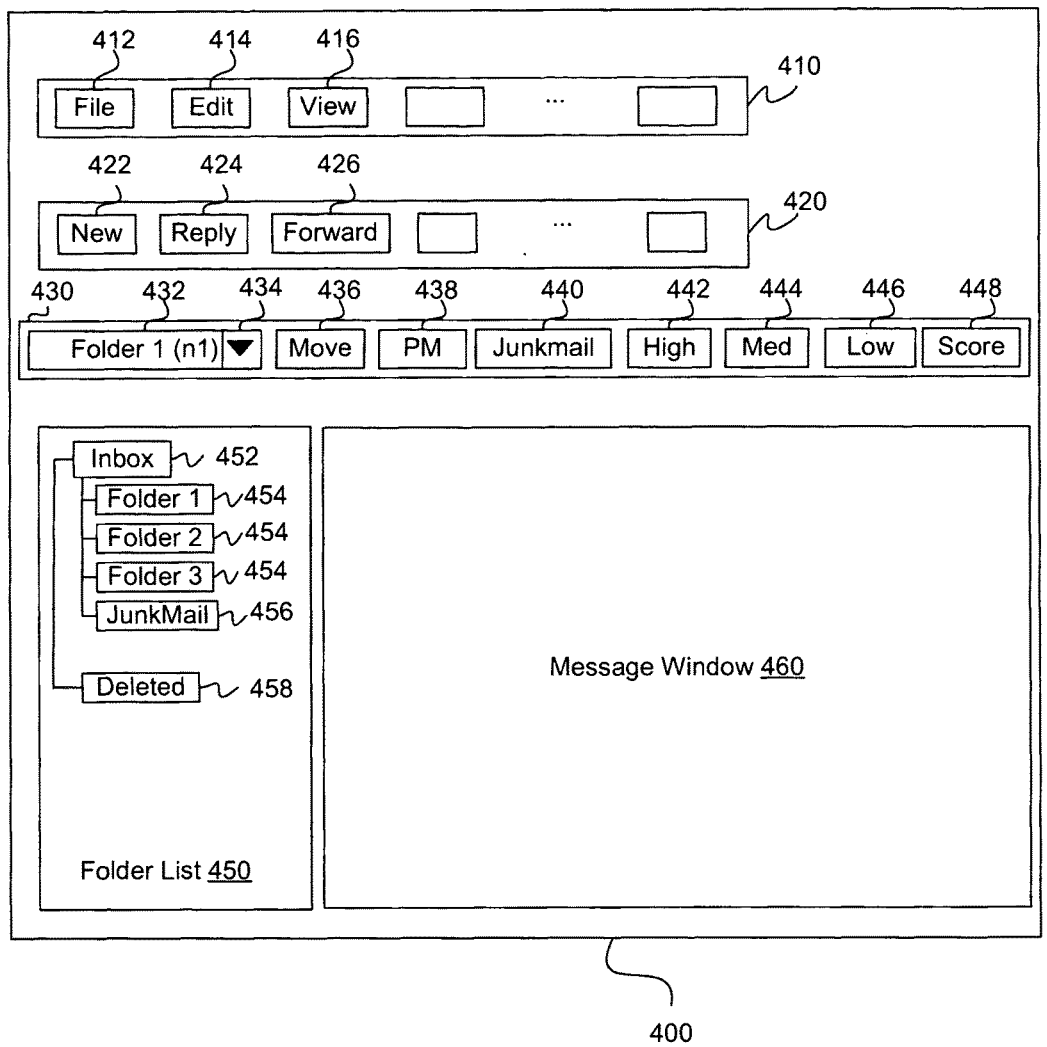
FIG. 4 is a diagram of one embodiment of an explorer window of the email application of FIG. 1, according to the invention.

FIG. 4 is a diagram of one embodiment of an explorer window 400 of the user interface of email application 122 of FIG. 1, according to an embodiment of the invention. Window 400 includes, but is not limited to, a window toolbar 410, an email toolbar 420, a productivity toolbar 430, a folder list 450, and a message window 460. Window toolbar 410 includes a file menu button 412, an edit menu button 414, and a view menu button 416. Window toolbar 410 may include any other appropriate menu buttons. Email toolbar 420 includes a new button 422 configured to open a new blank message, a reply button 424 configured to open a reply message, and a forward button 426 configured to open a forward message window. Email toolbar 420 may include any other appropriate buttons.

Productivity toolbar 430 includes buttons that allow the user to provide input to email productivity module 126. Productivity toolbar 430 includes, but is not limited to, a folder pull-down menu 432, a move button 436, a productivity module (PM) button 438, a junkmail button 440, a high button 442, a medium (med) button 444, a low button 446, and a score button 448. A window of folder pull-down menu 432 displays a highest scoring folder for a selected message in message window 460. The user can actuate an arrow button 434 to view the rest of the set of suggested folders and a "select a folder" choice (to select a folder that doesn't appear in the set of suggested folders). Folder pull-down menu 432 shows the folder name and score for each suggested folder. Actuating move button 426 moves the selected message to the folder currently selected in folder pull-down menu 432.

Actuating junkmail button 440 provides explicit feedback to junkman module 218 that the selected message in message window 460 is junkman. In one embodiment, actuating junkmail button 440 also moves the selected message to the junkmail folder or deletes the selected message. Actuating high button 442, medium button 444, or low button 446 provides explicit feedback to prioritization module 212 regarding the priority of the selected message in message window 460. Actuating score button 448 causes email productivity module 126 to score (or re-score) a selected message or messages in message window 460. In response to input from score button 448, the selected message or messages will be scored by prioritization module 214, message sorting module 216, and junkmail module 218.

Actuating productivity module 438 button opens a productivity module window (not shown) that allows the user to modify certain aspects of email productivity module 126. A message sorting tab allows the user to enable or disable an automove function for message sorting module 216, designate a sorting score threshold, enable or disable categories, designate a category threshold, and select a base folder. A junkmail tab allows the user to enable or disable an automove function for junkmail module 218 and designate a junkmail score threshold. The productivity module window may also include a help button that provides access to help regarding the functions of email productivity module 126.

Folder list 450 includes, but is not limited to, an inbox folder 452, a plurality of folders 454, a junkmail folder 456, and a deleted items folder 458. The user can select any of these folders to view the messages in that folder in message window 460. The user can move a message to a folder in folder list 450 by dragging and dropping the message from message window 460 to the folder in folder list 450. As discussed above, moving a message into a folder in folder list 450 provides feedback to message sorting module 216, and moving a message into junkmail folder 456 provides feedback to junkmail module 218.

FIG. 5 is a diagram of one embodiment of message window 460 of FIG. 4. Message window 460 displays messages for a selected folder. In the FIG. 5 example, message window 460 displays messages in the inbox of email application 122. Message window 460 includes four messages 532, 534, 536, and 538. Message window 460 further includes a junkmail column 512, a priority score column 514, a priority level column 516, "a from" column 518, a subject column 520, and a received column 522. Other embodiments of message window 460 may contain additional columns.

Junkmail column 512 shows a junkmail score for each message as determined by junkman module 218. Priority score column 514 shows a priority score for each message and priority level column 516 shows a priority level for each message as determined by prioritization module 214. Message 532 is the currently selected message. The set of suggested folders for message 532 determined by message sorting module 216 is shown in folder pull-down menu 432 (FIG. 4).

It is noted that different and/or additional visual indications be employed to represent the junkmail score, priority score, and priority levels of listed email messages. For example, messages having a high priority score and level may be presented in a brightly colored font or other manner that draws the user's attention, whereas messages assigned a low priority score can be presented in a duller font. In addition, the message window may be configured to sort the messages in order of priority score or other user-selected field such that messages having relatively greater importance to the user are grouped together above and apart from messages having relatively lesser importance.

Figure 6:
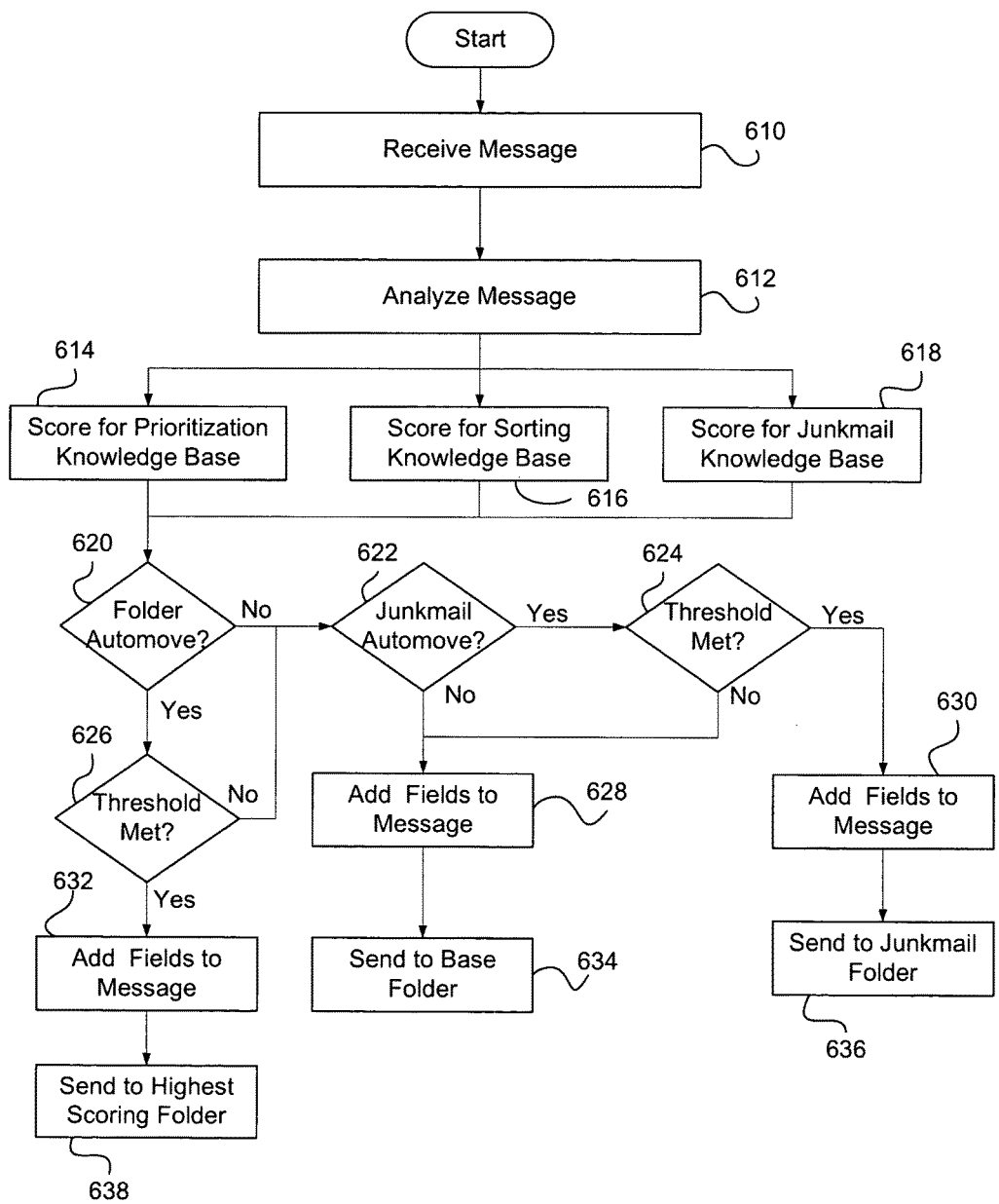
FIG. 6 is a flowchart of method steps for processing a received email message according to one embodiment of the invention.

FIG. 6 is a flowchart of method steps for processing a received email message according to one embodiment of the invention. Although the steps of FIG. 6 are discussed in the context of email productivity module 126 and email productivity add-in 124, any other means configured to perform the steps are within the scope of the invention. In step 610, email productivity module 126 receives an email message. In step 612, content analysis engine 212 analyzes the content of the message using language processing techniques. Then, in step 614, prioritization module 214 applies the content information to prioritization knowledge base 224, producing a priority score and a priority level. At about the same time, in step 616, message sorting module 216 applies the content information to sorting knowledge base 226, producing a set of suggested folders. At about the same time, in step 618, junkman module 218 applies the content information to junkman knowledge base 228, producing a junkman score for the message.

Then, in step 620, email productivity module 126 determines whether a folder automove function is currently enabled. If the folder automove function is not enabled, the method continues with step 622. If the folder automove function is enabled, then in step 626 email productivity module 126 determines whether the score of the highest scoring folder of the set of suggested folders exceeds the designated threshold. If the score of the highest scoring folder does not exceed the designated threshold, then the method continues with step 622. If the score of the highest scoring folder exceeds the designated threshold, then in step 632, email productivity add-in 124 adds the priority score, priority level, set of suggested folders, and junkmail score fields to the message. Then, in step 638, email productivity add-in 124 sends the message to the highest scoring folder of email application 122.

In step 622, email productivity module 126 determines whether a junkmail automove function is enabled. If the junkman automove function is enabled, the method continues with step 624. If the junkmail automove function is not enabled, then in step 628 email productivity add-in 124 adds the priority score, priority level, set of suggested folders, and junkmail score fields to the message. In step 634, email productivity add-in 124 sends the message to the base folder, such as the inbox, of email application 122.

In step 624, email productivity module 126 determines whether the junkmail score for the message exceeds the designated threshold. If the junkmail score does not exceed the designated threshold, then the method continues with step 628, discussed above. If the junkman score exceeds the designated threshold, then in step 630 email productivity add-in 124 adds the priority score, priority level, set of suggested folders, and junkmail score fields to the message.

In step 636 email productivity add-in 124 sends the message to the junkmail folder of email application 122.

It is noted that the steps set forth above are preferably performed automatically upon receipt of each incoming email. However, in other embodiments and implementations, the foregoing steps or portions thereof may be performed only on selected messages, at specified intervals, or responsively to a user request.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. An electronic mail apparatus, comprising:
a computing device capable of being connected to a network; and
an email productivity module, executed by the computing device, and configured to interact with an existing email application executed by the computing device that sends and receives email messages over the network, wherein the email productivity module includes:
a content analysis engine, executed by the computing device, configured to analyze a received email message to generate content information representative of a content of the received email message;
a prioritization module, executed by the computing device, having at least one prioritization knowledge base implemented on the computing device, the prioritization module being configured to apply the content information to the at least one prioritization knowledge base to determine at least one priority score for the received email message that reflects a relative priority of the received email message as a legitimate email message and to assign at least one priority level to the received email message based on the priority score that reflects a range of priority scores;
a message sorting module, executed by the computing device, having at least one sorting knowledge base implemented on the computing device, the message sorting module being configured to apply the content information to the at least one sorting knowledge base to determine a set of suggested folders for the received email message that represent one or more folders in which are stored other emails having similar content and in which a user would be most likely to store the received email message; and
a junkmail module, executed by the computing device, having at least one junkmail knowledge base implemented on the computing device, the junkmail module being configured to apply the content information to the at least one junkmail knowledge base to determine a junkmail score for the received email message that represents a probability that the received email message is junkmail, and the junkmail module being configured to cause a user interface of the existing email application to modify a presentation of the received email message in accordance with the junkmail score;
the email productivity module being configured to attach fields for the priority score, priority level, set of suggested folders, and junkmail score to the received email message for display by the existing email application;

the email productivity module being configured to receive user feedback to the existing email application indicative of a user action taken with respect to the received email message, and to cause the computing device to adapt the at least one prioritization knowledge base, the at least one sorting database, or the at least one junkmail database, in accordance with the user feedback;

wherein the at least one prioritization knowledge base is adapted by the computing device in accordance with explicit user feedback in an event that the user modifies the at least one priority level or the at least one priority score produced by the prioritization module and attached to the received email message for display; and wherein the at least one prioritization knowledge base is adapted by the computing device in accordance with implicit user feedback in an event that the user does not modify the at least one priority level or the at least one priority score produced by the prioritization module and attached to the received email message for display.

2. The apparatus of claim 1, wherein the email productivity module responsively adapts the at least one prioritization knowledge base immediately upon receipt of the user feedback.

3. The apparatus of claim 1, wherein the email application is caused to display both the at least one priority level and the at least one priority score in connection with the received email message.

4. The apparatus of claim 1, the message sorting module being configured to cause the user interface of the email application to modify the presentation of the received email message to display the suggested folders.

5. The apparatus of claim 1, wherein the sorting knowledge base is updated by the explicit user feedback if the user moves the received email message to a folder.

6. The apparatus of claim 1, wherein the at least one junkmail knowledge base is updated by the explicit user feedback if the user indicates that the received email message is junkmail.

7. The apparatus of claim 1, wherein the content analysis engine analyzes the content of the received email message by analyzing a text of the received email message using natural language processing techniques.

8. The apparatus of claim 1, wherein the email productivity module includes an intelligent search function that allows a user to select one or more messages and search stored messages in every folder to find messages with similar content.

9. The apparatus of claim 1, wherein the email productivity module includes a folder management function that analyzes the content of previously stored messages in each folder and identifies messages that may not belong in a particular folder according to information in the at least one sorting knowledge base.

10. The apparatus of claim 1, wherein the email productivity module is configured to execute a prespecified operation if the priority score exceeds a predefined threshold.

11. The apparatus of claim 10, wherein the prespecified operation comprises forwarding the received email message to a wireless device.

12. The apparatus of claim 10, wherein the prespecified operation comprises tagging the received email message with a relevant tag.

13. The apparatus of claim 1, wherein the email productivity module is further configured to forward the received email message to a wireless device if a highest scoring folder matches a predetermined folder.

14. The apparatus of claim 1, wherein the message sorting module is further configured to automatically move the received email message to a folder if a score for the folder exceeds a predetermined or dynamic threshold.

15. The apparatus of claim 1, wherein the junkmail module is further configured to automatically move the received email message to a junkmail folder if the junkmail score for the received email message exceeds a predetermined or dynamic threshold.

16. The apparatus of claim 1, wherein the junkmail module is further configured to automatically delete the received email message if the junkmail score for the received email message exceeds a predetermined or dynamic threshold.

17. The apparatus of claim 1, wherein the message sorting module is configured to assign a folder to the received email message if a folder score exceeds a category threshold.

18. The apparatus of claim 17, wherein the email productivity module is further configured to organize or tag received email messages according to folder.

19. The apparatus of claim 1, wherein the at least one prioritization knowledge base is structured as a set of models, each model uniquely corresponding to one of a plurality of priority levels.

20. The apparatus of claim 1, wherein the sorting knowledge base is structured as a set of models, each model uniquely corresponding to one of a set of folders.

21. The apparatus of claim 1, wherein the at least one junkmail knowledge base is structured as a set of two models, consisting of a junk model and a nonjunk model.

22. A method for providing increased email productivity, comprising:

receiving an email message at an email productivity module, executed by a computing device capable of being connected to a network, and configured to interact with an existing email application, executed by the computing device, that sends and receives email messages over the network, wherein the email productivity module performs the steps of:

analyzing the email message, in a content analysis engine executed by the computing device, to generate content information representative of a content of the email message;

applying the content information, in a prioritization module executed by the computing device, to at least one prioritization knowledge base implemented on the computing device to determine at least one priority score for the email message that reflects a relative priority of the email message as a legitimate email message and to assign at least one priority level to the email message based on the priority score that reflects a range of priority scores;

applying the content information, in a message sorting module executed by the computing device, to at least one sorting knowledge base implemented on the computing device to determine a set of suggested folders for the email message that represent one or more folders in which are stored other emails having similar content and in which a user would be most likely to store the email message; and applying the content information, in a junkmail module executed by the computing device, to at least one junkmail knowledge base implemented on the computing device to determine a junkmail score for the email message that represents a probability that the email message is junkmail, and to cause a user interface of the existing email application to modify a presentation of the email message in accordance with the junkmail score;

the email productivity module being configured to attach fields for the priority score, priority level, set of suggested folders, and junkmail score to the email message for display by the existing email application;

the email productivity module being configured to receive user feedback to the existing email application indicative of a user action taken with respect to the email message and to cause the computing device to adapt the at least one prioritization knowledge base, the at least one sorting database, or the at least one junkmail database, in accordance with the user feedback;

wherein the at least one prioritization knowledge base is adapted by the computing device in accordance with explicit user feedback in an event that the user modifies the at least one priority level or the at least one priority score produced by the prioritization module and attached to the email message for display; and wherein the at least one prioritization knowledge base is adapted by the computing device in accordance with implicit user feedback in an event that the user does not modify the at least one priority level or the at least one priority score produced by the prioritization module and attached to the email message for display.

23. The method of claim 22, wherein analyzing the email message to determine content includes using natural language processing techniques.

24. The method of claim 22, further comprising updating the sorting knowledge base using the user feedback.

25. The method of claim 22, further comprising automatically moving the email message to a folder if a score for that folder exceeds a predetermined or dynamic threshold.

26. The method of claim 22, further comprising updating the at least one junkmail knowledge base using the user feedback.

27. The method of claim 22, further comprising automatically moving the email message to a junkmail folder if the junkmail score exceeds a predetermined or dynamic threshold.

28. The method of claim 22, further comprising deleting the email message if the junkmail score exceeds a predetermined or dynamic threshold.

29. The method of claim 22, further comprising forwarding the email message to a wireless device if the priority score exceeds a predetermined or dynamic threshold.

30. The method of claim 22, further comprising:
selecting at least one stored email message;
analyzing the selected at least one stored email message to generate content information; and
searching among other stored email messages to identify email messages with content information similar to the content information of the selected stored email message.

31. The method of claim 22, further comprising reorganizing stored email messages based on the content information.

32. The method of claim 22, wherein categories or tags characterizing the content of the email message are displayed to the user interface.

* * * * *